United States Patent [19]

Feller

[11] Patent Number: 5,976,586

[45] Date of Patent: Nov. 2, 1999

[54] GLAZE COMPOSITION WITH VEGETABLE GUMS

[75] Inventor: Lester Feller, Niles, Ill.

[73] Assignee: Lawrence Foods, Elk Grove Village, Ill.

[21] Appl. No.: 08/814,516

[22] Filed: Mar. 10, 1997

[51] Int. Cl.⁶ ..................................................... A21D 13/00
[52] U.S. Cl. ............................. 426/89; 426/94; 426/273; 426/302; 426/575; 426/578
[58] Field of Search .............................. 426/94, 578, 575, 426/293, 302, 272, 273, 89

[56] References Cited

U.S. PATENT DOCUMENTS

| | | | |
|---|---|---|---|
| 4,645,674 | 2/1987 | Lang et al. | 426/94 |
| 4,863,751 | 9/1989 | Voss | 426/532 |
| 5,225,222 | 7/1993 | Cha et al. | 426/89 |
| 5,431,937 | 7/1995 | Kandl et al. | 426/281 |

OTHER PUBLICATIONS

Owen R. Frenna, "Food Chemistry", p. 199, 1996.

*Primary Examiner*—Lien Tran
*Attorney, Agent, or Firm*—Sidley & Austin; Hugh A. Abrams

[57] ABSTRACT

A food glaze composition for coating food items including bakery products. The glaze composition includes one or more natural or modified vegetable gums and is eggless and protein-free. The composition imparts a shine, aids in browning, retards moisture loss from the glazed product, and can be applied to food products before and/or after baking and freezing. The glaze composition is also effective in controlling the development of mold, yeast and bacteria.

12 Claims, No Drawings

GLAZE COMPOSITION WITH VEGETABLE GUMS

FIELD OF THE INVENTION

This invention relates to a food glaze composition. More particularly, this invention relates to a glaze composition with vegetable gums for coating food items such as bakery products.

BACKGROUND OF THE INVENTION

Bakers have applied a coating or "wash" to the surface of bakery products to improve the appearance of baked goods. Typically, washes were used prior to baking to impart a shiny, smooth, attractive appearance to the baked products. Initially, these bakery egg washes or sugar washes often contained whole eggs, dried egg white solids, milk protein from a variety of dairy products, oils and fats, starches, sugars, syrups and dextrins derived from various sources. Typically, these washes are not satisfactorily applied after baking, directly to a finished bakery product, or used prior to freezing a bakery product. Also, typically, these washes lack convenience and versatility, as they require immediate use.

For example, the conventional egg wash promotes the growth of microbial organisms, and thus requires constant refrigeration, immediate preparation, and use of brushes and containers which may easily become contaminated with microbial growth. Also, egg washes typically do not bake evenly, often burning or producing streaking and variation in color and shine if the egg wash is not evenly mixed. Moreover, egg washes are not effective in reducing cracking and chipping on baked items, must be applied directly before baking, and cannot be successfully used after baking. Because of the potential health hazards of using egg products on perishable commercial foods, egg washes have been disfavored, and a need for eggless washes exists. Eggless washes typically rely on non-egg white proteins such as sodium or calcium caseinates, soy proteins, whey proteins, yeast proteins and mixtures thereof to impart an acceptable shine. See, e.g., U.S. Pat. No. 4,863,751 to Voss. However, these eggless washes are still susceptible to microbial decomposition. Further, protein-containing washes are not suitable for certain protein-restricted diets (allergens). Accordingly, there is a need for an eggless, protein-free product having desirable baking and stability properties.

The present invention provides a composition that is eggless, protein-free, convenient, versatile and can impart desired properties to food products such as baked or frozen goods.

SUMMARY OF THE INVENTION

The composition of the present invention is a food glaze composition capable of providing food items such as bakery products with an even color and uniform shine. In general, this eggless, protein-free composition includes vegetable gums and other components in an aqueous mixture. Because the composition does not contain egg or milk protein, it is intended for all consumers, including those having dietary or religious (e.g., kosher) restrictions relating to proteins from specific sources. The composition does not require special preparation, and is available in ready-to-use, condensed, or dry formulations. Moreover, the composition can be used in spray-on or brush-on applications. The composition may be applied to a bakery product either before or after baking, as well as to baked or partially baked products prior to freezing. Thus, for example, the composition does not need to be applied at high temperature during baking. The composition can also reduce crust cracking and chipping on baked items, especially pies. Finally, the composition does not require refrigeration, and can be kept at room temperatures for months.

DETAILED DESCRIPTION OF THE PREFERRED EMBODIMENTS

In one embodiment, the composition of the glaze comprises (in weight %) at least one source of vegetable gum, in a combined amount of from about 0.3 to 15%; at least one source of modified food starch, in a combined amount of from about 1 to 30%; water, in an amount up to about 90%; at least one preservative, in a combined amount of from about 0.01 to 1.00%; and at least one acidulant, in a combined amount of from about 0.1 to 15%. All percents given in the description and claims of this invention are weight percents. The presence of vegetable gum provides the finished gloss to the baking products; it is believed that these gums serve as film-forming gums. Moreover, the use of vegetable gum as a main ingredient for the gloss avoids the need for egg or milk protein in the glazing composition. The modified food starch imparts viscosity and shine to the wash. It is presently understood that the modified food starch and vegetable gums react favorably in the system to improve the properties of the glaze composition. A solubilizing media, such as water, may be added to the system in an amount of up to about 90% by weight of the composition to aid the application of the glaze to the bakery product. Alternatively, the glaze may be prepared in a condensed or concentrated portion with only a portion of the water. The source of acidulation provides the proper pH in the composition for operation of conventional food preservatives, such as sodium benzoate and potassium sorbate.

In other embodiments, the glaze composition of the previous embodiment additionally comprises (in weight %) at least one reducing sugar and/or syrup substrate, in a combined amount of from about 2 to 30%; and/or at least one carrier, in a combined amount of from about 1.5 to 18%. A source of reducing sugars is included in the combined amount of from about 2 to 30% by weight of the composition to enhance the browning of the baked goods. As discussed below, high fructose corn syrup is one such syrup substrate. As further discussed below, carriers or dispersing agents, other than water, may be used as a dispersing media for the vegetable gum, acidulation source and modified food starch.

Thus, in one embodiment, the composition of the invention has the following components: at least one source of vegetable gum, at least one source of modified food starch, water, at least one preservative, at least one food acidulant, at least one source of reducing sugar and/or syrup substrate, and at least one carrier, generally in the following proportions, which includes dry, condensed and ready-to-use formulations of the composition:

| Ingredient | % by Weight |
|---|---|
| vegetable gum | 0.30–15 |
| modified food starch | 1–30 |
| water | 0–90 |
| preservative | 0.01–1.00 |

-continued

| Ingredient | % by Weight |
|---|---|
| food acidulant | 0.1–15 |
| reducing sugar and/or syrup substrate | 2–30 |
| carrier | 1.5–18 |
| | 100% |

Colors, flavorings and pH buffers may also be added to the above glaze compositions, as described below. Of course, the proportion of the main ingredients will vary depending on the amount of such additions to the composition.

In another embodiment of the invention, the composition is ready-to-use, and has the following components, generally in the following proportions, where it is again understood that each component comprises one or more sources of each ingredient:

| Ingredient | % by Weight |
|---|---|
| vegetable gum | 0.3–2.1 |
| modified food starch | 1–4 |
| water | 70–90 |
| preservative | 0.1–0.5 |
| food acidulant | 0.1–0.8 |
| reducing sugar and/or syrup substrate | 2–10 |
| carrier | 1.5–5.0 |
| | 100% |

In one embodiment, as described in Example 1 below, the glaze composition comprises (in weight %), the following ingredients: chelated agar (0.28%); gum arabic (0.28%); microcrystalline cellulose (0.28%); modified corn starch (2.97%); water (90.19%); sodium benzoate (0.05%); potassium sorbate (0.05%); citric acid (0.50%); 42 DE high fructose corn syrup (3.72%); and maltodextrin (1.86%).

A variety of natural or modified vegetable gums may be incorporated into the composition. Any conventional source of the vegetable gums can be used as long as the gum is suitable for use in food products. Combinations of both natural and modified vegetable gums can be used in the glaze composition. In general, natural gums are water-soluble plant products composed of monosaccharide units joined by glycosidic bonds. Natural gums include extracts from vegetable matter; for instance, these include extracts from vegetable and fruit tissues, seeds, roots, beans, plant and tree exudates, and seaweed, as well as gums obtained by microbial fermentation. In general, modified vegetable gums include derivatives of natural vegetable gum and particular synthetic gums. Modified vegetable gums can be prepared by chemical or physical reactions such as polymerization, or by mechanical alterations such as agglomeration, for example.

Suitable natural vegetable gums include, but are not limited to the following: gum arabic (acacia gum), guar gum (guar flour), agar (agar-agar), carrageenan gum (alpha, kappa and all other types), karaya gum (sterculia gum; India tragacanth, kadaya gum), gum ghatti, locust agar, algin, pectin, xanthan gum, locust bean gum, gum tragacanth, tamarind gum, and combinations thereof. Suitable modified vegetable gums include, but are not limited to the following: chelated agar; pectin derivatives including both low- and high-methoxyl pectin; alginates such as propylene glycol alginate; cellulose derivatives such as microcrystalline cellulose, methylcellulose, sodium carboxymethyl cellulose, carboxymethylcellulose, hydroxypropyl cellulose, hydroxypropyl methyl cellulose, and sodium hydroxymethyl cellulose; carboxymethyl locust bean gum; gellan gum; carboxymethyl guar gum; and combinations thereof.

Typically, the combined amount of the suitable natural and/or vegetable gums present in the composition is from about 0.3% to 15% by weight of the composition. In a ready-to-use formulation, for example, the combined amount of vegetable gums is from about 0.3% to 2.1% by weight of the composition. In one ready-to-use formulation, the amount (in weight %) of the vegetable gums was as follows: chelated agar (chelated agar (D), Bunge Foods), 0.28%; gum arabic (Sethness-Greenleaf Company), 0.28%; and microcrystalline cellulose (RC591F, FMC Corporation), 0.28%. It should be noted that the suppliers of various ingredients used in this composition are provided as one source of these ingredients; other comparable commercial sources of these ingredients may, of course, also be used.

A commercial modified food starch is used in the composition to impart additional viscosity and shine to the wash. The starch may be derived from any vegetable source, and include water-soluble polymers derived from a corn, potato, tapioca, wheat, rice, sago, sorghum or starch by, for example, acetylation, chlorination, acid hydrolysis, or enzymatic action. Typically, the combined amount of one or more such modified food starches is from about 1% to 30% by weight of the composition. In a ready-to-use formulation, for example, the combined amount of modified food starch is from about 1% to 4% by weight of the composition. In one particular ready-to-use formulation, the amount of modified corn starch (Polar gel #13, American Maize-Products Co.) used was 2.97% by weight of the composition.

The water used in the present invention may be, for example, tap, bottled or treated water having a pH of from about 6 to 7. Typically, the amount of water present in the composition is up to 90% by weight of the composition. In a ready-to-use formulation, for example, the amount of water present in the composition is from about 70% to 90% by weight of the composition. In one particular ready-to-use formulation, the amount of water was 90.19% by weight of the composition. It may be desirable to condense the vegetable gum composition or to delete a portion of the water from the formulation to produce a concentrated formulation. In the case of a dry formulation, water can be added to the product to reconstitute the vegetable gum composition.

Reducing sugars and/or syrup substrates may be included to enhance the browning of the baked products. It is believed that these sugars react with the protein in flour to form a brown coloration. Suitable sugar components include, for example, fructose (levulose) such as high fructose corn syrup, glucose (dextrose), galactose, maltose (malt sugar; maltobiose), and combinations thereof. Typically, the combined amount of such reducing sugars and/or syrup substrates is from about 2% to 30% by weight of the composition. In a ready-to-use formulation, for example, the combined amount of reducing sugars and/or syrup substrates is from about 2 to 10% by weight of the composition. In one particular ready-to-use formulation, the amount of high fructose corn syrup (ISO 42 DE, Chicago Sweeteners) used was 3.72% by weight of the composition A small amount of an edible acid (e.g., food acidulant) may be included in the composition of this invention to lower the pH of the composition to below about 4.5. Typically, the combined amount of such food acidulant is from about 0.1% to 15% by weight of the composition. In a ready-to-use formulation, for example, the combined amount of acidulant is from about 0.1% to 0.8% by weight of the composition. It is believed that the lowered pH may increase the effectiveness of preservatives such as potassium sorbate and sodium benzoate. Suitable edible acids include citric acid (2-hydroxy-1,2,3-propane tricarboxylic acid), adipic acid (hexanedioic acid; 1,4-butanedicarboxylic acid), malic acid (hydroxysuccinic acid; apple acid), and the like. In one particular ready-to-use formulation, the amount of citric acid (Gadot Biochemical Industries) used was 0.50% by weight of the composition.

A carrier, diluent, or dispersing agent such as maltodextrin or dextrin may be used in the present composition. Typically, the combined amount of such carrier is from about 1.5% to 18% by weight of the composition. In a ready-to-use formulation, for example, the combined amount of carrier is from about 1.5% to 5.0% by weight of the composition. In one particular ready-to-use formulation, maltodextrin (M-100 Maltrin®, Grain Processing Corporation, Muscatine, Iowa), was used at the amount of 1.86% by weight of the composition.

A relatively low amount of a chemical preservative or spoilage inhibitor may be included in the composition. These preservatives may, for example, aid in controlling growth of mold, yeast and bacteria. Typically, the combined amount of such preservative is from about 0.01% to 1.00% by weight of the composition. In a ready-to-use formulation, for example, the combined amount of preservatives is from about 0.1% to 0.5% by weight of the composition. Suitable preservatives include, for example, potassium sorbate, sodium benzoate, propylene glycol, and combinations thereof. In one particular ready-to-use formulation, potassium sorbate (powder, Ashland Chemical) was present at 0.05% by weight of the composition; and potassium sorbate (powder, Ashland Chemical) was present at 0.05% by weight of the composition.

In addition, for example, food coloring agents and flavoring agents, either natural or artificial or both, antioxidants, and pH buffers may be incorporated into the composition. Flavoring agents include any substance that is, for example, sweet, sour, salty, savory, herbal or spicy to the taste, and variations thereof. For example, it may be desirable to include sugarless sweeteners including sugar alcohols such as sorbitol, mannitol, xylitol, hydrogenated starch hydrolysates, maltitol, sucralose, aspartame, salts of acesulfame, saccharin and its salts, cyclamic acid and its salts, glycyrrhizin, and combinations thereof. Coloring agents include, for example, annatto, caramel, tumeric, carotene, or other artificial or natural yellow "egg" coloring agents and combinations thereof. Antioxidants include, for example, butylated hydroxyanisole (BHA), butylated hydroxytoluene (BHT), propyl gallate, citric acid, or the like. Also, it may be desirable to include any suitable commercial pH buffer in the composition.

Those skilled in the art to which the invention pertains may make modifications and other embodiments employing the principles of this invention without departing from its spirit or essential characteristics particularly upon considering the foregoing teachings. The described embodiments, as well as the Examples below, are to be considered in all respects only as illustrative and not restrictive and the scope of the invention is, therefore, indicated by the appended claims rather than by the foregoing description Consequently, while the invention has been described with reference to particular embodiments and Examples, modifications would be apparent to those skilled in the art, yet still fall within the scope of the invention.

EXAMPLE 1

A ready-to-use formulation of the composition was formed from the following ingredients:

| Ingredient | % by Weight |
| --- | --- |
| chelated agar | 0.28 |
| gum arabic | 0.28 |
| microcrystalline cellulose | 0.28 |
| modified corn starch | 2.97 |
| water | 90.19 |
| sodium benzoate | 0.05 |
| potassium sorbate | 0.05 |
| citric acid | 0.50 |
| high fructose corn syrup (42 DE) | 3.72 |
| maltodextrin | 1.86 |
|  | 100.00 |

This ready-to-use composition was prepared by adding water to a cooking kettle equipped with high shear and scraped surface mixers. All ingredients except the citric acid were first added to the high shear mixer, and mixed until all the ingredients were suspended in the wash. In this example, the ingredients were obtained from the following suppliers: chelated agar (chelated agar (D), Bunge Foods); gum arabic (Sethness-Greenleaf Company); microcrystalline cellulose (RC591F, FMC Corporation); modified corn starch (Polar gel #13, American Maize-Products Co.); potassium sorbate (powder, Ashland Chemical); sodium benzoate (powder, Ashland Chemical); citric acid (Gadot Biochemical Industries); high fructose corn syrup (ISO 42 DE, Chicago Sweeteners); and maltodextrin (Maltrin M-100, Grain Processing Corporation). The scrape surface mixing blades were then be employed as the mixture was heated to 190° F., and held at that temperature and continually mixed for five minutes. The mixture was cooled to 180° F., and citric acid was then added. The composition was then packed in 1 gallon plastic jars at 170–175° F. for storage.

EXAMPLE 2

A ready-to-use composition was prepared as described in Example 1, and was sprayed or brushed onto various food items, before and/or after baking, before and/or after freezing. The composition imparted an even color and shine to various food items, including fruit and savory (e.g., turkey pot pie, other meat pies) pies, danish pastries, coffee cakes, puff pastry (e.g., turnovers), hard crust breads and rolls, partially-baked hard crust breads and rolls, and oven-baked bagels. In the case of oven-baked bagels, use of the composition eliminated the need of boiling or steaming the bagels, for shine, prior to baking. Also, use of the composition reduced the amount of cracks and chips on baked items such as the pie crust of the fruit and savory pies.

What is claimed is:

1. A food glaze composition comprising:
   (a) a combination of vegetable gums comprising at least chelated agar, gum arabic and microcrystalline cellulose, present in a combined amount of from about 0.3 to 15% by weight of the composition;
   (b) a modified food starch, present in an amount of from about 1 to 30% by weight of the composition;
   (c) water, present in an amount up to 90% by weight of the composition;
   (d) a preservative, present in an amount of from about 0.01 to 1.00% by weight of the composition;
   (e) a food acidulant, present in an amount of from about 0.1 to 15% by weight of the composition;

(f) a reducing sugar and/or syrup substrate, present in an amount of from about 2 to 30% by weight of the composition; and (g) maltodextrin, present in an amount of from about 1.5 to 18% by weight of the composition.

2. The food glaze composition of claim 1, further comprising at least one coloring agent.

3. A. The food glaze composition of claim 1, further comprising at least one flavoring agent.

4. The food glaze composition of claim 1, further comprising at least one pH buffer.

5. The food glaze composition of claim 1, further comprising at least one antioxidant.

6. The food glaze composition of claim 1, wherein:
(a) said combination of vegetable gums comprising at least chelated agar, gum arabic and microcrystalline cellulose, is present in a combined amount of from about 0.3 to 2.1% by weight of the composition;
(b) said modified food starch is present in an amount of from about 1 to 4% by weight of the composition;
(c) said water is present in an amount of from about 70 to 90% by weight of the composition;
(d) said preservative is present in an amount of from about 0.1 to 0.5% by weight of the composition;
(e) said food acidulant is present in an amount of from about 0.10 to 0.80% by weight of the composition;
(f) said reducing sugar and/or syrup substrate is present in a an amount of from about 2 to 10% by weight of the composition; and
(g) said maltodextrin is present in an amount of from about 1.5 to 5% by weight of the composition.

7. The food glaze composition of claim 1, wherein said composition comprises:
(a) chelated agar present in the amount of 0.28% by weight composition, gum arabic present in the amount of 0.28% by weight composition, and microcrystalline cellulose present in the amount of 0.28% by weight of the composition;
(b) modified corn starch present in the amount of 2.97% by weight of the composition;
(c) water present in the amount of 90.19% by weight of the composition;
(d) sodium benzoate present in the amount of 0.05% by weight of the composition, and potassium sorbate present in the amount of 0.05% by weight of the composition;
(e) citric acid present in the amount of 0.50% by weight of the composition;
(f) 42 DE high fructose corn syrup present in the amount of 3.72% by weight of the composition; and
(g) maltodextrin present in the amount of 1.86% by weight of the composition.

8. A food coating composition made by combining:
(a) a combination of vegetable gums comprising at least chelated agar, gum arabic and microcrystalline cellulose, in a combined amount of from about 0.3 to 15% by weight of the composition;
(b) a modified food starch in an amount of from about 1 to 30% by weight of the composition;
(c) water in an amount up to 90% by weight of the composition;
(d) a preservative in an amount of from about 0.01 to 1.00% by weight of the composition;
(e) a food acidulant in an amount of from about 0.1 to 15% by weight of the composition;

(f) a reducing sugar and/or syrup substrate in an amount of from about 2 to 30% by weight of the composition; and (g) maltodextrin in an amount of from about 1.5 to 18% by weight of the composition.

9. The food coating composition of claim 8, wherein said composition is made by combining:
(a) said combination of vegetable gums in a combined amount of from about 0.3 to 2.1% by weight of the composition;
(b) said modified food starch is present in an amount of from about 1 to 4% by weight of the composition;
(c) said water is present in an amount of from about 70 to 90% by weight of the composition;
(d) said preservative is present in an amount of from about 0.1 to 0.5% by weight of the composition;
(e) said food acidulant is present in an amount of from about 0.10 to 0.80% by weight of the composition;
(f) said reducing sugar and/or syrup substrate is present in an amount of from about 2 to 10% by weight of the composition; and
(g) said maltodextrin is present in an amount of from about 1.5 to 5.0% by weight of the composition.

10. The food coating composition of claim 8, wherein said composition is made by combining:
(a) chelated agar in the amount of 0.28% by weight composition, gum arabic in the amount of 0.28% by weight composition, and microcrystalline cellulose in the amount of 0.28% by weight of the composition;
(b) modified corn starch in the amount of 2.97% by weight of the composition;
(c) water present in the amount of 90.19% by weight of the composition;
(d) sodium benzoate in the amount of 0.05% by weight of the composition, and potassium sorbate in the amount of 0.05% by weight of the composition
(e) citric acid in the amount of 0.50% by weight of the composition;
(f) 42 DE high fructose corn syrup in the amount of 3.72% by weight of the composition; and
(g) maltodextrin in the amount of 1.86% by weight of the composition.

11. A glazed food product having a glaze composition on the surface thereof, wherein said glaze composition comprises, as applied, of:
(a) a combination of vegetable sums comprising at least chelated agar, gum arabic and microcrystalline cellulose, present in a combined amount of from about 0.3 to 2.1% by weight of the composition;
(b) a modified food starch is present in an amount of from about 1 to 4% by weight of the composition; and
(c) water present in an amount of from about 70 to 90% by weight of the composition;
(d) a preservative present in an amount of from about 0.1 to 0.5% by weight of the composition;
(e) a food acidulant present in an amount of from about 0.10 to 0.80% by weight of the composition;
(f) a reducing sugar and/or syrup substrate present in an amount of from about 2 to 10% by weight of the composition; and
(g) maltodextrin present in an amount of from about 1.5 to 5.0% by weight of the composition.

12. The glazed food product of claim 11, wherein said glaze composition comprises, as applied, of:
(a) chelated agar present in the amount of 0.28% by weight composition, gum arabic present in the amount of 0.28% by weight composition, and microcrystalline cellulose present in the amount of 0.28% by weight of the composition;
(b) modified corn starch present in the amount of 2.97% by weight of the composition;
(c) water present in an amount of 90.19% by weight of the composition;
(d) sodium benzoate present in the amount of 0.05% by weight of the composition, and potassium sorbate present in the amount of 0.05% by weight of the composition
(e) citric acid present in the amount of 0.50% by weight of the composition;
(f) 42 DE high fructose corn syrup present in the amount of 3.72% by weight of the composition; and
(g) maltodextrin present in the amount of 1.86% by weight of the composition.

* * * * *